Sept. 15, 1959                F. W. KERTELL                2,904,153
                               PARKING METER
Filed Sept. 6, 1955                                    8 Sheets-Sheet 1

INVENTOR
FRANK W. KERTELL
BY
Gardner & Zimmerman
ATTORNEYS

Sept. 15, 1959        F. W. KERTELL        2,904,153
PARKING METER Filed Sept. 6, 1955        8 Sheets-Sheet 3

INVENTOR
FRANK W. KERTELL
BY
ATTORNEYS

Sept. 15, 1959     F. W. KERTELL     2,904,153
PARKING METER Filed Sept. 6, 1955     8 Sheets-Sheet 4

INVENTOR
FRANK W. KERTELL
BY
ATTORNEYS

Sept. 15, 1959  F. W. KERTELL  2,904,153
PARKING METER
Filed Sept. 6, 1955  8 Sheets-Sheet 5

INVENTOR
FRANK W. KERTELL
BY
ATTORNEYS

Sept. 15, 1959     F. W. KERTELL     2,904,153

PARKING METER

Filed Sept. 6, 1955                          8 Sheets-Sheet 6

INVENTOR
FRANK W. KERTELL
BY
ATTORNEYS

Sept. 15, 1959 F. W. KERTELL 2,904,153
PARKING METER

Filed Sept. 6, 1955 8 Sheets-Sheet 7

INVENTOR
FRANK W. KERTELL
BY *Gardner & Zimmerman*
ATTORNEYS

Sept. 15, 1959 F. W. KERTELL 2,904,153
PARKING METER
Filed Sept. 6, 1955 8 Sheets-Sheet 8

INVENTOR
FRANK W. KERTELL
BY
ATTORNEYS

2,904,153

PARKING METER

Frank W. Kertell, Oakland, Calif., assignor of one-half to Clyde D. Voglesong, Oakland, Calif.

Application September 6, 1955, Serial No. 532,435

8 Claims. (Cl. 194—72)

The present invention relates to a new and improved parking meter.

The meter of the present invention is adapted to accept coins varying in size from a ten cent piece to and including a fifty cent piece so as therefore to have a much wider range than conventional meters. A multitude of additional advantageous features are incorporated in the invention, as for example the control mechanism accommodates the passage of coins into a coin receiver without registering time unless the coins are of the proper size, with the result that slugs neither actuate the meter nor stop up same. This feature is achieved through the novel control mechanism wherein a particular condition is established by the passage of a coin therethrough depending upon the size of the coin and then the needle is rotated in accordance with this condition, no needle movement being made during passage of the coin through the mechanism.

Also, the meter of the present invention is proof against overregistering of time through juggling of the handle following insertion of a coin, a unique floating cam accomplishing this result.

Despite the wide range of coins that are accommodated by the meter no jamming is possible by the simultaneous insertion of more than one small coin and provision is made for preventing successive acceptance of more than one coin before operation upon the first is completed.

It is an object of the present invention to provide an improved parking meter capable of accepting a wide range of coins and registering time according to size thereof.

It is another object of the present invention to provide a parking meter adapted to accept slugs without jamming and without registering time.

It is a further object of the present invention to provide a parking meter adapted to accept coins from five cents to fifty cents and preventing jamming from simultaneous or successive insertion of more than one coin.

It is yet another object of the present invention to provide a parking meter including means preventing additional registry of time by juggling of the handle following insertion of a coin.

It is a still further object of the present invention to provide a parking meter having control mechanism setting a characteristic condition for each coin accepted and following deposit of the coin in a receptacle setting an indicator in accordance with said condition.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

The invention is illustrated in the accompanying drawings wherein:

Figure 3 is a diagonal sectional view taken at 3—3 of Figure 2.

Figure 1:
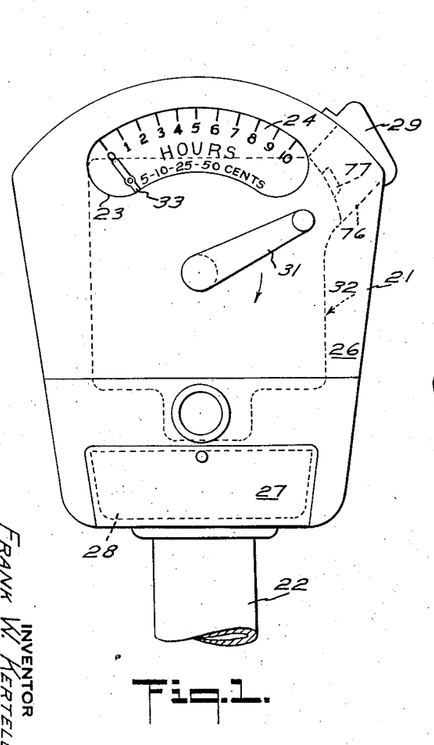
Figure 1 is a front elevational view of the parking meter.
Figure 2:
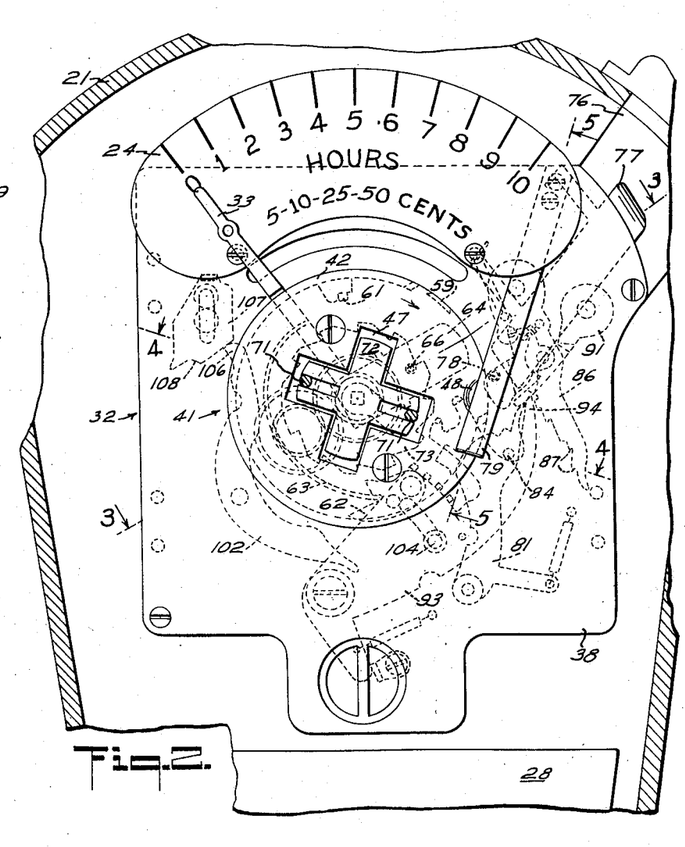
Figure 2 is a front elevational view of the meter with the outer housing removed to show the internal mechanism.

Considering now the structural details of a preferred embodiment of the invention and referring first to an exterior view thereof in Figure 1, the invention will be seen to have a somewhat conventional outer appearance in comprising a housing 21 that is rather flat with the top thereof somewhat wider than the bottom and being adapted for rigid attachment atop a vertical standard 22 at the bottom of the housing. The front of the housing 21 contains a window 23 across one side thereof adjacent the top and preferably curved, as shown, to accommodate a dial 24 mounted within the housing in registry with the window 23. There is provided either in the front or back surface of the housing a swinging door 26 locked in place and allowing access to the interior of the housing while an additional locked door 27 on the housing front provides access to a coin box 28 at the bottom of the housing and interiorly thereof. A coin receiver 29 extends above the housing 21 and downward into same for accepting coins deposited in the meter. There is mounted for rotation upon the front of the housing 21 a handle 31 which is spring loaded within the housing to return to a normal position. Within the housing as shown in Figures 2 and 3 there is generally included a control mechanism 32 which is limitedly releasable by coins received thereat and controllable rotatable by the handle 31. A needle 33 registering with the dial 24 is operatively connected to this mechanism 32 for indicating the rotational disposition of parts thereof and a clock escapement 34 is jointed to the mechanism through reduction gears 36 and an arbor shaft 37 on the escapement for returning the mechanism 32 to normal position at a controlled rate following rotation thereof. Also within the housing are fixed front and back walls 38 and 39 respectively, for carrying at least a part of the control mechanism 32.

Figure 7:
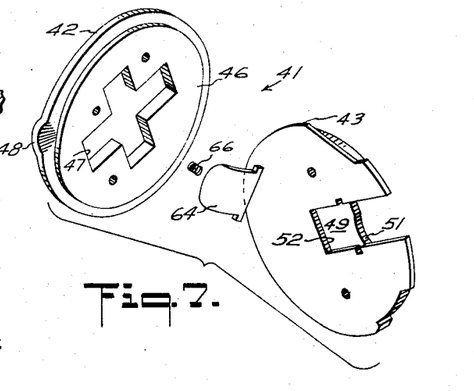
Figure 7 is an exploded view of two plates of the coin carrier with included spring plate.
Figure 8:
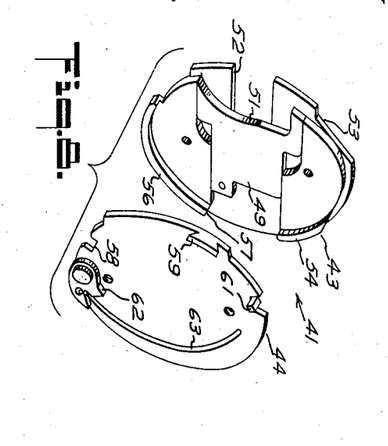
Figure 8 is an exploded perspective view of the mating back and central plates of the coin carrier.

Considering now the elements of the invention in some detail and choosing first a central portion of the control mechanism 32 herein termed the coin carrier 41, reference is made to Figures 7 and 8 illustrating same. The coin carrier 41 includes front, central and back discs 42, 43 and 44, respectively, with the front disc 42 having a flat circular configuration with a flat circular boss 46 raised on the rear surface thereof and inset slightly from the disc edge. A cross-shaped aperture 47 is disposed centrally of the front disc and extends transversely through same including the boss 46 thereon. Additionally, the front disc 42 has a raised portion or bump 48 at one point on the circumference thereof as may be made by expanding the metal thereof. The central disc 43 is generally circular with the back side or portion thereof having a slightly reduced diameter, as shown, and this back portion has a slot extending thereacross through the center thereof with one end of the slot having an increased width. A plate 49 rests within the slot above-mentioned and has an outer end thereof expanded laterally so as to fit the wider portion of the slot whereby the plate fits snugly in the slot. The plate 49 has the outer edge of the wide end thereof recessed with a curved surface 51 thereof adapted to engage the edges of coins pressed thereagainst by means later described. The recessed surface 51 of the plate 49 is set well back of the periphery of the front portion of the central disc 43 and a slot 52 is formed transversely through the disc 43 in alignment with the plate 49 and narrower than the latter, this slot extending substantially to the center of the disc so as to be covered as to the inner half thereof on one side by the plate 49. A short way about the disc circumference from the upper edge of the slot 52 there is formed an indentation 53 which slopes sharply inward and thence tapers gradually outward to the full circumferential measurement of the front portion of the central disc. Further about the periphery of the disc there is provided a first rail 54 which extends about the outer disc priphery to the top edge of right end of the slot in the back portion of the disc. This first rail has a leading surface tapered radially outward of the disc and extends axially beyond the back portion of the central disc. A second rail 56 is disposed circumferentially of the central disc from the lower edge of the slot in the back portion of the disc clockwise for a substantial arc in excess of ninety degrees whereat it terminates with the disc being recessed from this rear end of the rail 56 to the lower edge of the plate 49. The leading edge of this second rail is normal to the disc surface and forms a cam surface 57 adapted to engage cam means later described.

The final main element of the coin carrier 41 is the back disc 44 which is also generally circular and which has a peripheral indentation with a slanted leading edge corresponding to the leading edge of the indentation 53 on the central disc, but extending circumferentially about the disc 44 for about 290 degrees so that the back disc 44 fits upon the central disc 43 within the rails 54 and 56 thereon. A square recess 58 is formed radially inward of the back disc adjacent the rear end of the reduced diameter thereof.

Immediately ahead of the beginning of this reduced diameter is an upstanding lug 59 which extends normal to the back disc and flares outwardly away from the disc, while immediately past the beginning of the indentation there is provided a post 61 also extending normal to the back disc. Both the lug 59 and post 61 operate as cam surfaces and/or stops as set out below. Upon the back surface of the back disc 44 and diametrically across from the post 61 there is disposed a pawl 62 mounted for limited rotation upon a shaft affixed to the disc and retaining the pawl against the disc. Rotation of the pawl 62 is limited by a small pin extending from the rear surface of the back disc into an aperture in the pawl of greater size than the pin whereby the pawl may rotate between positions of engagement of the pin with opposite sides of the aperture. The pawl 62 has a curved edge facing and radially outward of the disc and the pawl is urged into a position outward of the disc by a spring 63 engaging the pawl and curving along the disc surface to an end extending through the disc and into a slot on the opposite side of the disc whereby such end of the spring is fixed. The curved outer surface of the pawl acts as a spring loaded cam surface movable against the force of the spring 63.

The above described discs of the coin carrier 41 are joined together and a spring plate 64 is disposed in the slot 52 in the central disc 43 with lateral ears disposed in recesses in the central disc whereby the spring plate pivots thereabout with the free end of the spring plate adjacent the outer end of the slot 52. A weak spring 66 is disposed between the spring plate and the front disc 42 so that the spring plate is spring loaded to move away from the central disc against the pressure of the spring 66, as best seen in Figure 3. The discs of the coin carrier 41 are pinned together to be rotated in unison from the handle 31 as noted below and while engaging a coin contacting the surface 51.

Figure 4:
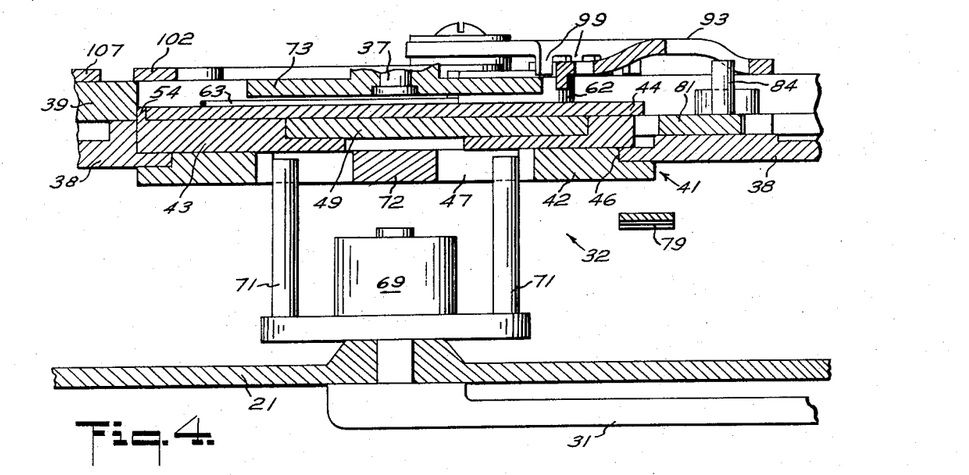
Figure 4 is a diagonal sectional view taken at 4—4 of Figure 2.

Considering further the connection of elements within the housing there will be seen, Figure 3, to be provided a pair of walls 38 and 39 internally of the housing 21 and extending thereacross in fixed relation to the external walls. These internal walls have mating transverse apertures within which the coin carrier is adapted to fit in rotatable disposition. The coin carrier 41 is rotated by the handle 31 which is mounted for rotation in the front wall of the housing with a spring 69 attached thereto and to the housing and urging the handle into a normal position. Connection between the handle and coin carrier, as best seen in Figures 2, 3 and 4 includes a pair of spaced bars 71 extending into the housing normal to the plane of rotation of the handle from a plate secured to the handle shaft interior to the housing. A cross lug 72, i.e., a lug having the shape of a cross, is disposed in the cross-shaped aperture 47 of the front disc 42 of the coin carrier with the cross lug 72 being smaller in all dimensions than the aperture whereby it is free to slide a short distance each way therein. On the outer surface of two opposing arms of the cross lug 72 there are formed slots longitudinally of the respective arms and the bars 71 from the handle fit therein bearing against the cross lug. Rotation of the handle thus causes the bars 71 to move about a circle and to turn the cross lug 72 that in turn rotates the coin carrier. The described cross lug attachment provides for maintaining alignment of the elements as a certain amount of slippage is incorporated in the connection, as noted above. Rotation of the coin carrier is transmitted to the escapement 34 by means of a ratchet plate 73 mounted upon the inner end of the arbor shaft 37 directly adjacent and parallel to the back disc 44 of the coin carrier in position to be engaged by the pawl 62. The teeth of the ratchet plate 73 are inclined to be engaged by the pawl only when the coin carrier is rotated in a clockwise direction as viewed from the front thereof and the ratchet plate is mounted to rotate freely upon the arbor shaft. Driving of the shaft by the ratchet, as shown in Figure 3, is accomplished through the gear train 36 with the first gear thereof bolted to a hub on the ratchet plate and also freely rotating about the shaft and intermediate meshing gears leading to a final gear fixed to the shaft whereby a reduction of rotational motion is effected between the coin carrier and the escapement, as for example four to one. The needle or indicator 33 is coupled by any suitable means to the first gear of the gear train for rotation therewith so as to swing only through the rotational displacement of the coin carrier and to turn back under the time controlled drive of the clock escapement 34. The back end of the arbor shaft 37 is suitably mounted for rotation and carries thereon a fixed arm adapted to contact a pin on the back of the escapement to form a stop 74 limiting rotation of the shaft to some 90 degrees.

Figure 5:
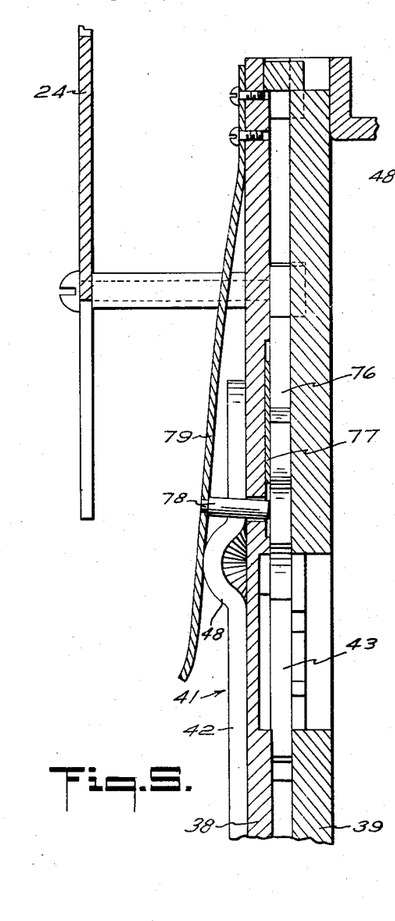
Figure 5 is a partial sectional view through the leaf spring as indicated at 5—5 of Figure 2.
Figure 6:
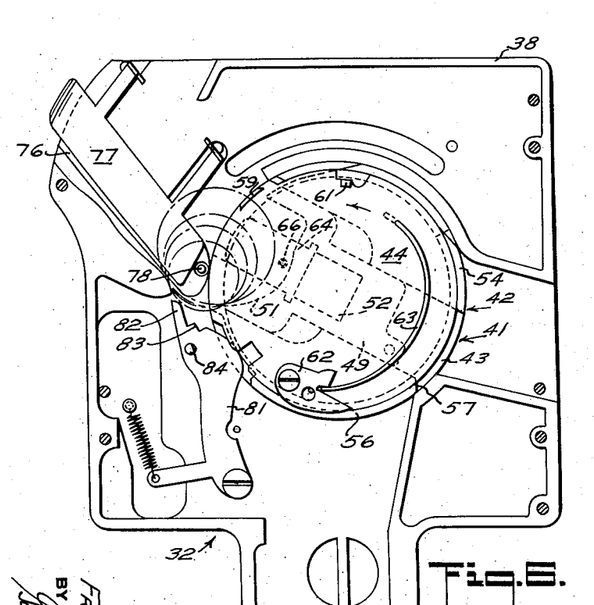
Figure 6 is a rear elevational view of the meter with the outer housing and back plate removed and showing the initial position of incoming coins at the coin carrier.

Considering now the insertion of coins into the meter, and referring particularly to Figures 3 and 6, there is defined between the front and back internal walls 38 and 39 a coin chute 76 extending from the exterior of the housing to the coin carrier at the recessed edge 51 of the plate 49. Within this chute 76 there is disposed a spring bar 77 having resilient arms extending normal thereto and held loosely in slots in back wall 39 whereby the spring bar 77 floats in the chute 76 to obstruct the simultaneous entry therein of two small coins and yet having insufficient tension to retard the passage of a single large coin. As shown in Figure 5, the coin chute 76 is further limited as to the passage of coins therethrough by a pin 78 disposed across the chute and extending through an opening in the front plate 38. The pin 78 is fixed to a leaf spring 79 that is in turn attached to the front plate 38 as by bolts and this spring urges the pin into the coin chute for closing same to the passage of coins. Closing of the coin chute by the pin 78 is controlled by the coin carrier 41 through the raised portion or bump 48 on the front disc thereof as in the normal or unrotated position of the coin carrier this bump is disposed beneath the overhanging end of the leaf spring 79 so as to deflect the spring and draw the pin 78 out of the coin chute. As the coin carrier is rotated following deposit of a coin in the carrier the bump 48 moves out from under the leaf spring 79 it swings back to position the pin 78 in the coin chute to effectively close same until the coin carrier is rotated back to normal position whereupon the pin 78 is again withdrawn from the chute to allow another coin to pass therethrough. By this means there is prevented the insertion of a coin until a previously inserted coin has been completely operated upon.

Figure 9:
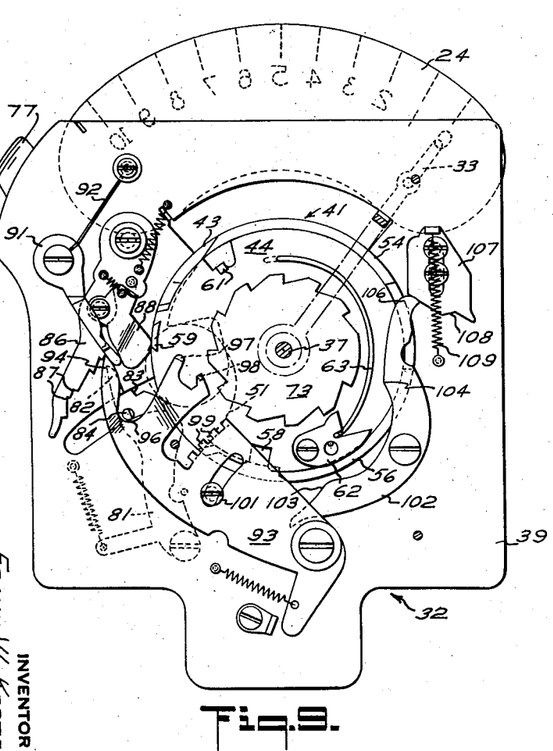
Figure 9 is a rear elevational view of the interior mechanism in an intermediate position of rotation with a five cent piece therein.

Considering now the portions of the control mechanism cooperating with the coin carrier and referring first to Figure 6, there is shown a primary lever 81 lying in the plane of the central disc 43 of the coin carrier directly below the coin chute 76. This primary lever 81 is pivotally mounted at the lower end thereof, has an outwardly curving surface on the upper right hand side thereof, and an upwardly extending finger 82 with a square shoulder 83 connecting the base of same to the outwardly curved portion of the lever. The primary lever is spring mounted to pivot toward the coin carrier as by an arm extending to the left of the bottom of the lever and having a spring attached thereto and extending upward into attachment with the front plate as by a bolt. A pin 84 is affixed to the back surface of the primary lever below the finger 82 thereof and is carried thereby, this pin extending through a curved slot in the back plate 39, as shown in Figure 9. The primary lever 81 is pivoted by the spring loading thereof into contact with the coin carrier 41 and as the coin carrier is rotated with a coin therein, the primary lever contacts the coin and holds same tightly in the coin carrier, meanwhile the lever 81 pivoting outward from the coin carrier an amount determined by the diameter of the coin over which the curved portion of the lever slides.

An additional element of the control mechanism 32 as seen in Figure 9, is a ratchet lever 86 pivotally mounted at the upper end thereof upon the back surface of the back plate 39 above the coin chute 76. This ratchet lever 86 is spring loaded to pivot about the upper end thereof toward the coin carrier and has formed along the lower portion of the side thereof adjacent the coin carrier a plurality of notches 87, particularly spaced as noted in more detail below. A spring loaded lug 88 is pivotally mounted on the back side of the ratchet lever extending toward the coin carrier and loaded to swing upwardly toward the carrier with a stop on the ratchet lever 86 limiting the upward swing thereof. The outer end of the spring loaded lug 88 is depressed toward the front plate 38 so as to lie in the same plane as the ratchet lever 86 on the side thereof toward the coin carrier. There is additionally provided in conjunction with the ratchet lever 86 a pivoted bar 91 which is pivotally mounted on the outer side of the ratchet lever and is deformed to extend thereover with the tip of the bar 91 lying in the same plane as the ratchet lever and immediately adjacent the end of the spring loaded lug 88 below same. The pivoted bar 91 is normally maintained in position by a torsion spring or bar 92 attached to the upper pivoted end thereof and to the back plate 39 and is pivotable under influence of the spring loaded lug 88 pressing against the outer end thereof as set out in detail below.

There is also mounted upon the rear surface of the back plate 39 a selector plate 93 which is pivotally mounted at the bottom thereof adjacent the bottom of the back plate and to the right of the center of the back plate as same is viewed from the rear, as in Figure 9. The selector plate 93 has an arm extending to the left from the bottom thereof to which is attached a spring secured to the back plate 39 for urging the plate to rotate in a clockwise direction and a stop on the back plate engages this arm to limit such rotation in a clockwise direction. At the top of the selector plate 93 is a finger 94 adapted to engage successive notches 87 in the ratchet plate 86 as the selector plate is pivoted and this finger has a curved cam surface 96 formed at the base thereof and extending to the right toward the coin carrier against which the pin 84 on the primary lever 81 is adapted to ride for pivoting the selector plate. Further to the right of the base of the finger beyond the cam surface 96 are disposed a pair of offset prongs 97 and 98 extending toward the front of the meter and almost into contact with the back surface of the rear disc 44 of the coin carrier 41 as to be engageable with the back disc lug 59 and post 61. The prongs 97 and 98 are actually disposed at the extremity of a projection extending from the side of the selector plate 93 and there is a side indentation directly below same with a gate 99 formed along the lower edge thereof and including a plurality of spaced prongs extending forward of the plate. The prongs of this gate 99 are adapted to engage the coin carrier lug 59 or post 61 in particular pivotal positions of the selector plate and to allow passage of same through the spaces in the gate for other plate positions. A guide pin 101 extends through a curved slot in the selector plate between the front and back plates. It will be seen that the pivotal disposition of the selector plate determines the amount by which the coin carrier may be rotated, this being all described in detail below.

As an added feature of the present invention there is provided a floating cam 102, see Figure 9, pivotally mounted at the center thereof to the right and below the center of the coin carrier on the back plate 39 as the meter is viewed from the rear. This floating cam 102 is somewhat crescent shaped with the tail, to the left, in Figure 9 having an upwardly curved cam surface or tail 103 and the inner end curve of the floating cam terminating in a sharp corner near the head of the cam to form a shoulder 104. The head or top 106 of the floating cam is rounded and rests against a slide member 107 that is slidably mounted for vertical motion only upon the back plate 39 above the floating cam. This slide member 107 as viewed from the rear of the meter as in Figure 9 has an under surface sloping downward from the left edge thereof to a point past the center line of the slide member whereat a notch 108 is formed upwardly of the lower edge of a size to readily accommodate the head 106 of the floating cam 102. The slide member 107 is urged downward by a spring 109 attached thereto and to a pin on the back plate 39 below the slide member, with movement of the slide member being limited by the fact that the slot therein containing pins from the back plate is of limited length. The floating cam 102 and slide member 107 lie in a single plane below that of the selector plate 93 so that the lug 59 and post 61 on the rear disc 44 of the coin carrier are adapted to contact the tail surface and shoulder of the floating cam for actuating same. Also the flotaing cam is mounted sufficiently close to the coin carrier that the pawl 62 thereon also contacts the shoulder 104 during rotation of the coin carrier.

With regard to the time controlled return of the needle 33 across the dial 24 of the meter, such is accomplished by means of the clock escapement 34 which is actuated through the reduction gears 36. As to the actuation of the escapement, as shown in Figure 3, the ratchet wheel 73 is mounted upon the inner end of the arbor shaft 37 in sliding engagement so as to be free to rotate thereabout. The first gear of the gear train 36 is affixed to the ratchet wheel 73 so as to rotate therewith but not with the shaft 37 and the last gear of the train is secured about the shaft in fixed relation thereto. Rotation of the coin carrier 41 past a certain point engages the pawl 62 thereon with the ratchet wheel 73 to rotate same and this rotation is multiplied through the gear train 36 as by a factor of four and the arbor shaft 37 rotated this amount. The clock escapement 34 is connected to the arbor shaft so as to be actuated by rotation of same whereby the escapement thereupon commences to rotate the shaft in the reverse direction at a controlled rate. The needle 33 is attached to the arbor shaft and extends through slots in the front and back plates of the meter into registry with the dial so that the needle is initially displaced by shaft rotation and slowly returns to zero position as the shaft rotates back under control of the clock escapement 34.

With regard to the operation of the present invention, the following description of same is separated into the occurrences with each different coin and reference is made to Figure 6 showing the position of elements following the insertion of any coin from five cents to fifty cents (shown in phantom) and prior to rotation of the handle.

As shown in Figure 6, a coin inserted in the coin chute 76 drops down along the spring bar 77 past the pin 78 which is held out of the coin chute by the coin carrier and into contact with the recessed edge 51 of plate 49 under the spring plate 64. With the needle 33 at zero time on the dial 24 as shown in Figure 2, counter-clockwise rotation of the coin carrier as urged by the handle spring 69 is prevented by the pawl 62 striking and bearing upon the gate 99 of the selector plate 93.

Figure 11:
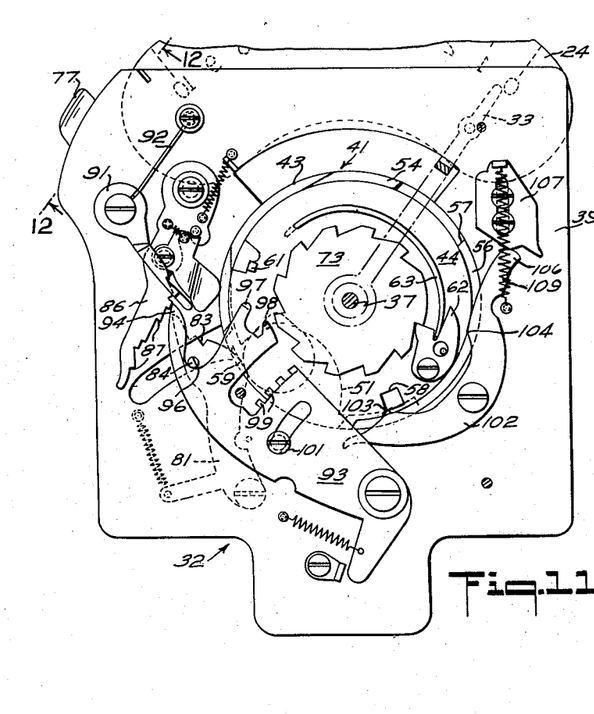
Figure 11 is a rear elevational view of the interior mechanism at an intermediate rotational position carrying a ten cent piece.
Figure 12:
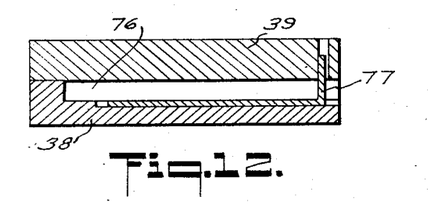
Figure 12 is a sectional view taken at 12—12 of Figure 11 showing details of the spring bar.
Figure 13:
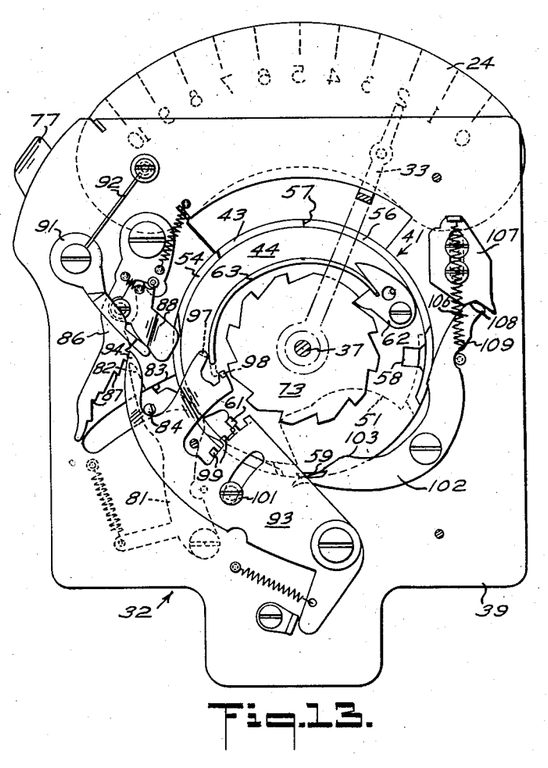
Figure 13 is a rear elevational view of the interior mechanism at a maximum position of rotation following deposit of a ten cent piece.

Considering first the smallest coin capable of actuating the meter, a dime, and referring to Figures 11 and 13, the sequence of events during movement from the position of Figure 6 to that of Figure 11 where the dime falls through into the coin box is as follows: Referencing all directions to the meter as viewed from the back, a counter-clockwise rotation of the handle 31 by one depositing the dime rotates the coin carrier counter-clockwise through the handle bars and against the tension of spring 69. As the coin carrier rotates the primary lever 81 pivots against the dime to hold same firmly in the coin carrier by virtue of the spring loading of this lever. This rotation of the coin carrier causes the back plate lug 59 to strike the spring loaded lug 88 and pivot same clockwise against the pivot bar 91 and to pivot the ratchet lever clockwise so that the bottom thereof moves to the left. As the back plate lug 59 moves past the spring loaded lug 88 the ratchet lever 86 is held by the finger 94 of the selector plate 93. The selector plate 93 was meanwhile rotated into this engaging position with the ratchet lever by the primary lever 81 which was swung to the left by the coin pressing against the curved portion thereof and the lever pin 84 riding along the selector plate cam surface 96. As the coin carrier rotates until the coin slides over the outermost part of the primary lever 81 the coin is then no longer held in the coin carrier and it drops therefrom downward into the coin box below the control mechanism, the point of departure of the coin from the coin carrier being shown in Figure 11. Primary lever 81 then swings back to normal position. Continued counter-clockwise rotation of the coin carrier causes the pawl 62 to strike the curved undersurface thereof upon the shoulder 104 of the floating cam 102, which rotates the pawl upward so that the pawl engages the ratchet wheel and also rotates the floating cam 102 to position the head 106 thereof in the notch 108 of the slide member 107. Rotation of the coin carrier is stopped by back disc post 61 of the coin carrier striking one of the prongs of the gate 99 and the shaft 37 and ratchet wheel have rotated to move the needle to the two hour position on the dial. Release of the handle allows the handle spring 69 to rotate the coin carrier back to initial position with the pawl 62 resetting the floating cam by striking the tail surface 103 thereof and the lug 59 hitting the spring loaded lug 88 to push the pivot bar against the ratchet lever 86 while the primary lever 81 rotates clockwise thereby releasing the selector plate to swing back into normal position. All parts are thus reset awaiting insertion of an additional coin for subsequent rotation.

Figure 10:
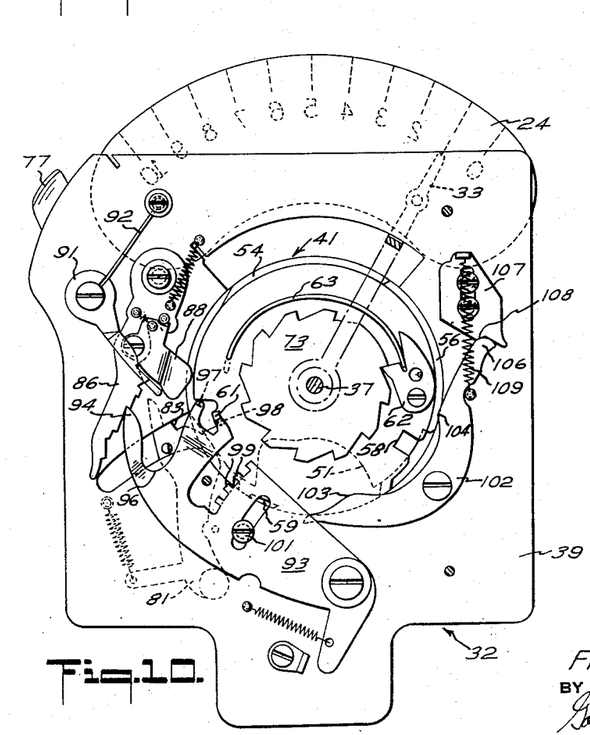
Figure 10 is a rear elevational view of the interior mechanism at the maximum position of rotation with a five cent piece.

The five cent operation as illustrated in Figures 9 and 10 commences in the same manner in that the coin carrier lug 59 strikes the spring loaded lug 88 to move the pivot bar 91 and the ratchet lever 86 to the left. The pivot bar 91 strikes the selector plate finger 94 to swing this plate slightly to the left. Meanwhile the primary lever 81 is swung to the left by the nickel pressing thereagainst and as the ratchet lever 86 is at maximum deflection by the lug 59 the primary lever pin 84 strikes the cam surface 96 of the selector plate and swings the plate further to engage the finger 94 thereof with the second notch 87 on the ratchet lever 86. The coin then drops through and the primary lever 81 swings back to normal position. The pawl 62 is engaged with the ratchet wheel 73 and the floating cam operates as described above in connection with ten cent operation; however, in this instance the coin carrier is arrested by the post 61 thereof striking the outer prong 98 on the selector plate whereby the shaft and needle are rotated one-half as far as in the case of a ten cent piece to indicate one hour on the dial 24. Resetting of the parts is as in the above described operation with a dime.

Figure 14:
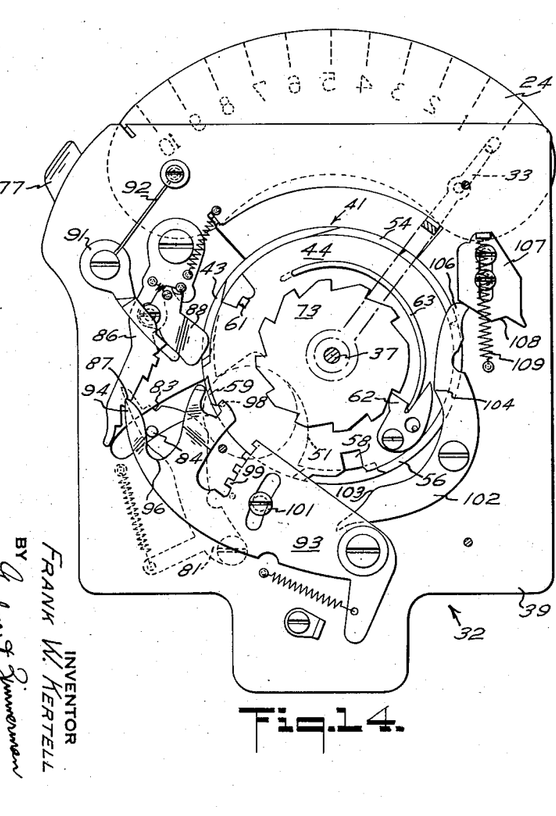
Figure 14 is a rear elevational view of the interior mechanism at an intermediate position of rotation with a twenty-five cent piece.
Figure 15:
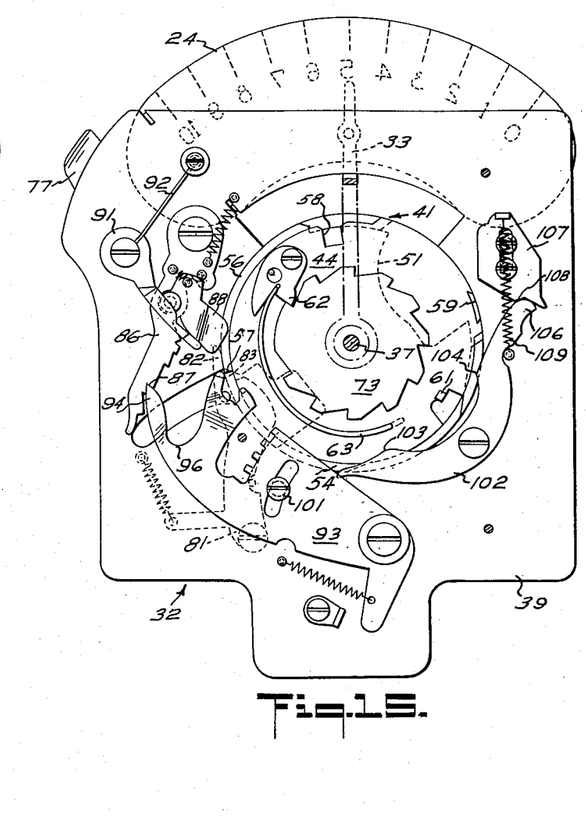
Figure 15 is a rear elevational view of the interior mechanism in a position of maximum rotation following deposit of a twenty-five cent piece.

Considering operation with a quarter, as shown in Figures 14 and 15, the coin carrier lug 59 again strikes the spring loaded lug 88 to force the pivot bar 91 and ratchet lever 86 to the left. Owing to the large size of the coin the primary lever 81 moves sharply to the left so that the pin 84 thereof engages the cam surface 96 to force the selector plate far to the left and engage the finger 94 thereof with an intermediate ratchet lever notch 87. The floating cam and pawl engage and operate as previously described, however, in this instance the lug 59 and post 61 rotate past the selector plate as the latter is swung out of the way so that the coin carrier lug 59 strikes the tail surface 103 of the floating cam to rotate the cam into vertical position and then strikes the shoulder 104 to swing the cam back to the right into the position of Figure 15. Rotation of the coin carrier 41 is stopped by the primary lever 81 which swings back into normal position following dropping of the coin and the shoulder 83 of the lever 81 strikes the front end or cam surface 57 of the second rail 56 on the coin carrier. In this position, as shown in Figure 15, the needle is vertical indicating five hours on the dial.

Figure 16:
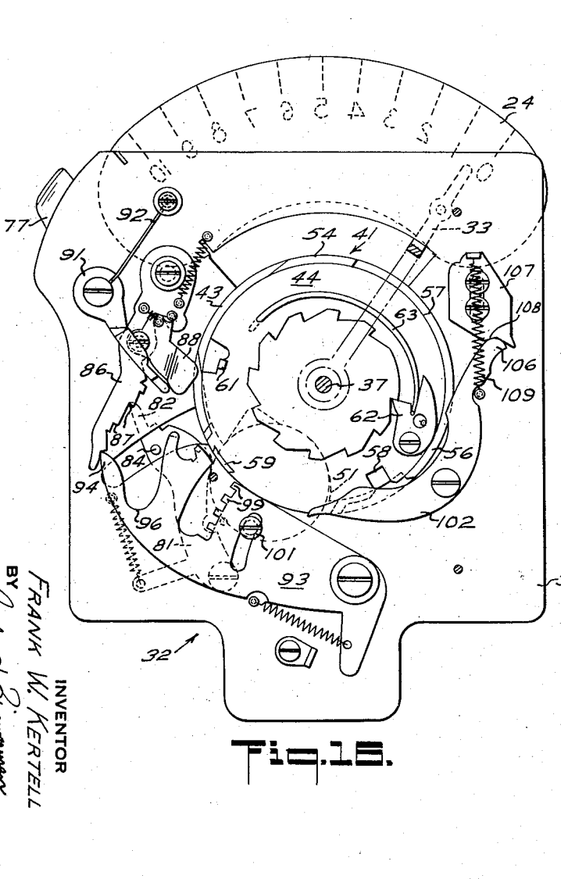
Figure 16 is a rear elevational view of the internal mechanism in an intermediate position of rotation carrying a fifty cent piece.
Figure 17:
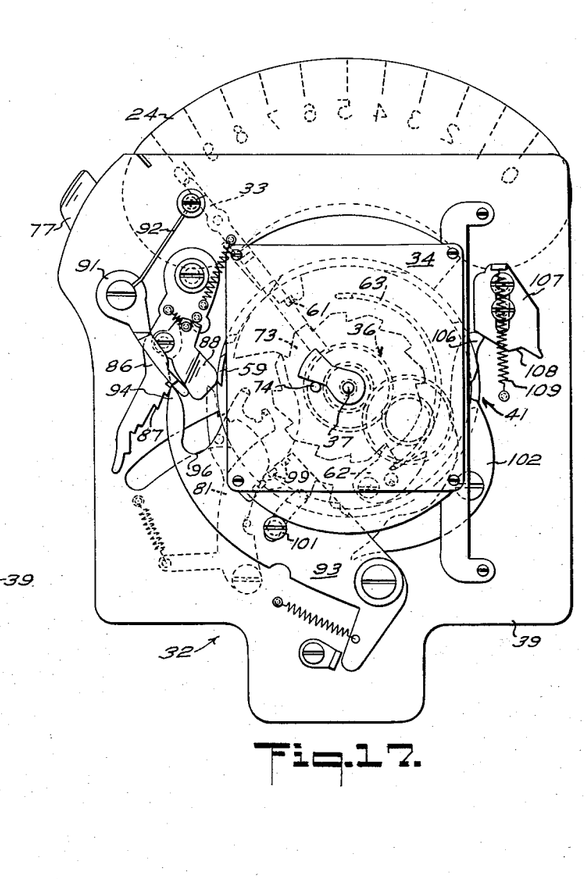
Figure 17 is a rear elevational view of the internal mechanism in a maximum position of rotation following deposit of a fifty cent piece.

The fifty cent piece operation as illustrated in Figures 16 and 17 commences with the primary lever 81 being quite rapidly rotated by the fifty cent piece so that the pin 84 rapidly forces the selector plate 93 to the left. The selector plate finger is held out of contact with ratchet lever by the size of the coin but as the coin drops through and the primary lever 81 swings back the selector plate finger 94 engages the last notch on the ratchet lever 86 so that the selector plate is held entirely out of contact with any portion of the coin carrier. The floating cam 102 is actuated in the same manner as in the case of the quarter and the coin carrier is rotatable through an angle greater than 360 degrees whereupon rotation of the arbor shaft 37 is arrested by the stop 74 on the back of the escapement. Directly prior to the termination of rotation of the coin carrier 41 the lug 59 thereon again strikes the spring loaded lug 88 to deflect same to the left and through the pivot bar 91 to force the ratchet lever 86 to the left whereby the selector plate finger 94 is released from the notch therein and the selector plate pivots back into normal position, as shown in Figure 17. Note that the pin 84 on the primary lever 81 strikes the inner prong 97 of the selector plate to hold the primary lever away from the coin carrier during the final half of the rotation of the coin carrier.

Considering now the operation of the meter following insertion of a slug of slightly different diameter than a real coin, it will be seen from Figure 6, for example, that the coin carrier may be rotated and that the fake coin carried thereby will pivot the primary lever 81. In turn the selector plate 93 will be swung to the left to a maximum pivoted position determined by the fake coin diameter, in which position the finger 94 engages the ratchet lever 86 at a point intermediate the notches 87 thereof corresponding to coin sizes larger and smaller than the fake coin. Extra notches are provided on the ratchet lever aside from those corresponding to real coin diameters provide a catch for the selector plate finger 94. The selector plate 93 is thus held in a position determined by the diameter of the fake coin diameter and the gate 99 is oriented to intercept the coin carrier lug 59 immediately following dropping of the coin from the coin carrier. The coin carrier rotation is thus arrested before any time is registered by the meter and upon release of the handle the coin carrier rotates back to normal position, thereby resetting the selector plate as noted above. By this means slugs or the like are accepted and deposited by the meter without the registry of any time on the dial thereof. There is thus incorporated in the meter an automatic "slug rejector" without additional parts.

It will be seen from the above description that coins smaller than a dime will drop through into the coin box without actuating the selector plate 93 so that the carrier lug 59 strikes the gate 99 and no further coin carrier rotation is possible to move the needle. Likewise other coins of slightly different diameter than—say a dime—such as a penny, will cause the carrier lug 59 to strike one of the prongs in the gate 99 instead of passing between them as is accomplished with coins of the proper diameter owing to the exact positioning of the selector plate by the ratchet lever.

One additional feature worthy of particular note is the floating cam 102 and the advantages thereof as herein incorporated. Throughout initial rotation of the coin carrier holding a coin wherein the selector plate position is set there is no drive between coin carrier and needle for the pawl 62 remains in its initial position out of contact with the ratchet wheel 73. Following dropping of the coin from the coin carrier, continued rotation of the latter causes the pawl 62 to strike the shoulder 104 of the floating cam 102 whereby the pawl is rotated radially inward of the coin carrier against the force of the spring 63 to engage the ratchet wheel. Further rotation of the coin carrier causes the pawl 62 to pivot the floating cam to the right, as viewed in Figure 9 for example, whereupon the cam head 106 is entrapped in the notch 108 of the slide member 107 to hold the cam to the right. The pawl 62 is held against the ratchet wheel 73 only by the pressure of the former against the latter, resulting from the resistance of the ratchet wheel to turning and the force exerted on the handle by one operating the meter. Should an attempt be made to back up the handle and rerotate same to register additional time the pawl immediately pivots outwardly under pressure from spring 63 as handle pressure is released and further rotation of the coin carrier by the handle does not turn the ratchet wheel as the pawl fails to engage same. The floating cam shoulder is out of position to again urge the pawl into engagement with the ratchet wheel and sufficient clockwise rotation of the coin carrier to cause the pawl to strike the floating cam tail surface 104 and reset the floating cam will place the coin carrier in lock position in that the selector plate and primary lever would be released to swing to the right and arrest additional counterclockwise rotation of the coin carrier. Thus there is no possibility of backing up the handle and rotating same again on a single coin to register additional time on the meter.

What is claimed is:

1. A parking meter including control mechanism comprising a rotary coin carrier having a peripheral coin recess and having three projections circumferentially spaced from said recess and a spring loaded pivotally mounted primary lever bearing upon the periphery of said coin carrier for holding coins in the recess thereof as said coin carrier rotates whereby said lever pivots proportional to the diameter of coins contacted, a pivotally mounted selector plate adjacent said coin carrier having spaced stops thereon and operatively connected to said primary lever for movement therewith, retaining means engaging said selector plate and holding same in maximum pivoted position corresponding to the respective diameter of the inserted coins whereby selected coin carrier projections strike said selector plate stops for arresting coin carrier rotation proportional to the diameter of coin actuating the mechanism, means for resetting said selector plate, and indicating means controlled by rotational displacement of said coin carrier.

2. A parking meter comprising a rotary member adapted to carry individual coins between receipt and deposit in a container and having a plurality of spaced projections thereon, lever means engaging said rotary member for displacement in accordance with the diameter of coins carried thereby and having stops thereon disposed thereby for striking projections on said rotary member to arrest rotation thereof at a point determined by the diameter of coin carried thereby, a ratchet wheel mounted for rotation adjacent said rotary means and operatively connected to an indicator on a dial, a pivotally-mounted spring-loaded pawl carried on said rotary means, a pivotally-mounted cam disposed adjacent said rotary means in position for engagement with said pawl following partial rotation of said rotary means to pivot said pawl into engagement with said ratchet wheel following release for deposit by said rotary means of a coin carried thereby.

3. A parking meter as claimed in claim 2 further defined by said cam having a crescent shape, pivoted adjacent the center thereof with spring loading normally positioning a first cam end over said rotary member to engage said pawl and said first end having a shoulder thereon for actuating said pawl by pivoting same into engagement with said ratchet wheel, spring-loaded retaining means adjacent said cam for releasably engaging same and holding the shoulder thereof out of engaging position with said pawl, said cam being pivoted into engagement with said retaining means by further rotation of said actuated pawl for disposing the other cam end in position to intercept said pawl upon return rotation whereby backing up and advancing of said ratchet wheel during a single operation is prevented.

4. Control mechanism for a parking meter comprising a coin carrier mounted for rotation and having a peripheral recess for receiving a coin, said carrier having three peripherally spaced axial projections thereon spaced from said recess, a pivoted lever mounted adjacent said carrier and spring loaded to bear upon said carrier at the recess thereof for holding a coin therein whereby said lever pivots an amount determined by the diameter of coin in the carrier as the latter rotates, pivotally mounted selector means operatively connected to said lever for movement thereby in an arc across said coin carrier and having a pronged gate thereon whereby selector movement through said lever by a real coin in the carrier disposes said gate in position to pass selected projections on said carrier, and ratchet means engagable with said selector for holding same in maximum displaced position for each selector movement whereby said selector arrests carrier rotation at points determined by the diameter of coins carried.

5. Control mechanism as claimed in claim 4 further defined by said ratchet means including a pivotally-mounted spring-loaded ratchet lever having a plurality of spaced notches thereon adapted to engage said selector, a spring-loaded lug pivotally mounted upon said lever and extending therefrom for contact by a projection on said coin carrier to pivot said ratchet lever into position for engagement with said selector, and a pivotally mounted spring bar having a portion thereof extending between a part of said lug and said ratchet lever for disconnecting said ratchet lever and selector upon lug displacement by return rotation of said carrier.

6. A parking meter comprising a coin carrier mounted for rotation and adapted to carry a coin between an entry chute and release some few degrees rotation therefrom, a primary lever pivotally mounted adjacent said carrier for bearing upon a coin carried thereby to pivot proportional to the coin diameter, a selector plate pivoted by said primary lever and having projections thereon extending toward said coin carrier, ratchet means adapted to retain said selector plate in maximum displaced position for each actuation thereof whereby said selector plate is differently positioned for each diameter coin carried and released by said coin carrier, said coin carrier having three peripherally spaced projections thereon of which two strike projections on said selector plate at different rotational carrier positions at separate selector plate positions and a third striking said primary lever at a separate coin carrier position whereby said coin carrier is arrested at three different positions corresponding to three different coin diameters, a shaft having an offset thereon and operatively connected to said coin carrier through reduction, and a stationary stop disposed to engage said shaft offset for limiting carrier rotation at slightly more than one revolution for a fourth controlled carrier displacement.

7. A parking meter comprising a rotatably mounted coin carrier adapted to carry a coin between entry and deposit and having projections thereon, a primary lever pivotally mounted adjacent said coin carrier for bearing on coins carried thereby to pivot proportional to coin diameter, a pivotally mounted selector plate having a gate and stops thereon operatively engaging said primary lever for displacement thereby, a ratchet lever having a plurality of notches thereon for engagement with said selector plate in a displaced position proportional to diameter of coin in said coin carrier whereby the projections on said coin carrier pass through said gate for real coin diameters and strike selector plate stops to arrest coin carrier rotation proportional to coin diameter and one of said projections strike said gate for all other selector plate displacements, and means indicating the degree of coin carrier rotation beyond the point where coin carrier projections could strike said gate.

8. A parking meter comprising a rotatably mounted coin carrier having projections thereon, a primary lever pivotally mounted adjacent said coin carrier for bearing on coins carried thereby and displacement proportional to diameters thereof, gate and stop means operatively connected to said primary lever for displacement thereby over the surface of said coin carrier, retaining means having a plurality of notches therein for retaining said gate and stop means in maximum displaced positions aligning the gate means for passing coin carrier projections for real coin diameters and striking coin carrier projections for other primary lever displacements, said stop means being disposed to strike coin carrier projections for arresting coin carrier rotation at points proportional to the diameter of real coin carried by same for primary lever displacement equal to the diameters of real predetermined coins, and means indicating the degree of coin carrier rotation past said gate.

References Cited in the file of this patent

UNITED STATES PATENTS

| | | |
|---|---|---|
| 502,715 | Gunther | Aug. 8, 1893 |
| 1,433,942 | Doldt | Oct. 31, 1922 |
| 1,846,611 | Riegel | Feb. 23, 1932 |
| 1,969,675 | Smith | Aug. 7, 1934 |
| 2,527,135 | Kafer | Oct. 24, 1950 |
| 2,563,182 | Michaels | Aug. 7, 1951 |
| 2,587,306 | Forsthoefel | Feb. 26, 1952 |
| 2,610,100 | Childers | Sept. 9, 1952 |
| 2,660,283 | Broussard | Nov. 24, 1953 |